Figure 1:
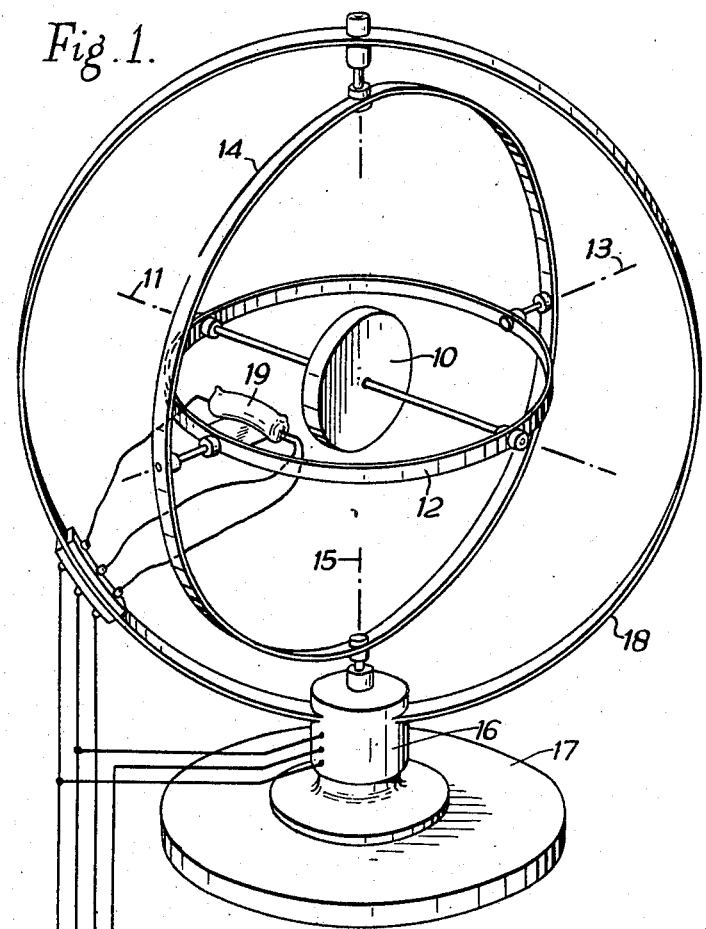

2,947,177

GYROSCOPES EMBODYING MERCURY SWITCHES

Robert Stanley Read, Barkingside, England, assignor to Kelvin & Hughes Limited

Filed Oct. 14, 1957, Ser. No. 689,790

Claims priority, application Great Britain Oct. 15, 1956

8 Claims. (Cl. 74—5.6)

This invention relates to gyroscopes embodying mercury switches. Such a mercury switch is usually mounted on the inner gimbal of a directional gyroscope and is so contructed that when the inner gimbal rotates out of a predetermined plane through a predetermined angle in either sense, the resultant movement of the mercury is such that it completes an electrical connection to a motor which tends to precess the gimbal back into the said plane.

A type of envelope in use comprises a glass envelope in the shape of a part of a torus, closed at both ends and fixed to the inner gimbal in such a way that the axis of the torus is parallel to the axis of the gimbal. When the gimbal is in the desired plane the lowest point along the length of the envelope is its centre. The envelope contains contact means at or near each end and also mercury which, owing to the shape and position of the envelope, is in the middle when the gimbal is in the desired plane and moves toward one end or the other as the inner gimbal rotates out of this plane. If the angle through which the gimbal moves is sufficient, the mercury will reach the contact means at one end of the envelope and complete one circuit of the motor. The motor then applies a torque to the gimbal in a sense that will precess it back toward the desired plane. Movement of the mercury toward the opposite end of the envelope will close another motor circuit which causes the motor to apply a torque in the opposite sense.

A disadvantage of this type of switch arises from the fact that when the inner gimbal rotates out of the desired plane, the mercury will move away from the centre of the glass envelope and thus the centre of gravity of the inner gimbal will shift from the inner gimbal axis. This causes a torque about this axis which causes precession of the outer gimbal about its axis. The inner gimbal may continue to topple until the mercury closes the contact means at one end of the tube when a torque will be applied by the motor about the outer gimbal axis precessing the inner gimbal towards its orthogonal position until the mercury leaves these contact means. If the inner gimbal does not topple so as to cause contact of the mercury and the contact means, then no torque will be applied to the outer gimbal and the inner gimbal will remain toppled at a small angle with the mercury off centre. In either case the mercury mass causes a torque about the inner gimbal axis in the same sense with consequent precession of the outer gimbal. Thus once the mercury is off centre, and whether it makes contact with contact means to initiate an erecting torque or not, its moment about the inner gimbal axis will cause precession of the outer gimbal. This condition will persist because of the reaction torque of the outer gimbal bearings until some disturbances, for example, a random friction torque or an acceleration, cause the mercury to move towards the other end of the tube. This known type of switch therefore tends to cause random precession of such a gyro.

To minimise these effects, caused by the movement of the mercury as above described, the length of the switch envelope, the mass of the mercury, and the angle through which the inner gimbal must rotate for the mercury to move from one contact means to the other, must be as small as possible.

The principal object of this invention is to eliminate the aforesaid disadvantage of the known form of gyroscope described. A subsidiary object of the invention is to provide a gyroscope with a switch so constituted that it can readily be arranged to indicate whether the gyroscope is working properly.

According to the present invention there is provided a gyroscope having, mounted on the inner gimbal thereof, a mercury switch comprising an envelope containing mercury and two switching means so disposed that when the inner gimbal is rocked in one direction one of the switching means is closed by the mercury and when the inner gimbal is rocked in the opposite direction the other of the switching means is closed by the mercury, characterized in that the floor of the envelope on which the mercury rests is convex upwards. The envelope is preferably so shaped that when the inner gimbal is in a predetermined plane, the floor of the envelope is lower at the aforesaid opposite extremities than at the middle by substantially equal amounts. A reversible motor mounted between the outer and inner gimbal is arranged to precess the inner gimbal, and is adapted to be energized for rotation in one direction or the other by circuits controlled by the contact means at the said two extremities respectively.

When the mercury reaches a first of the extremities, the motor rotates the inner gimbal in a sense such that the first extremity of the envelope, containing the mercury, rises. The mercury stays at the first extremity until the gimbal has rotated to a first predetermined angle out of the desired plane, when the slope of the envelope floor causes the mercury to move to the second of the two extremities of the envelope, causing the motor to precess the inner gimbal in the opposite sense and through the predetermined plane until it reaches a second predetermined angle relative to the plane, of the same magnitude as the first but in the opposite sense. In this position the slope of the envelope floor causes the mercury to move to the first extremity connecting the first contact means again, thereby completing a cycle which tends to be repeated regularly and continually.

Figure 2:
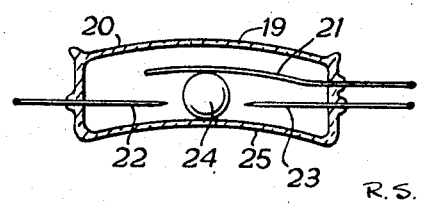

The invention will be described, by way of example, with reference to the accompanying drawing in which Figure 1 is a diagrammatic view in perspective of one embodiment of the invention and Figure 2 is an enlarged view in elevation of the mercury switch in Figure 1.

In Figure 1, a gyroscope comprises a flywheel 10 rotatable about a spin axis 11 in an inner gimbal 12 which is mounted for rotation about an axis 13 in an outer gimbal 14. The outer gimbal is rotatable about an axis 15 by a motor 16 mounted upon a base 17 to which a frame 18 is fixed.

As best shown in Figure 2 the switch 19 mounted on the inner gimbal 12 comprises a glass envelope 20 containing a common electrode 21 of arcuate shape and two other electrodes 22 and 23 having their inner ends pointed and close to a globule 24 of mercury. The mercury remains in contact with the common electrode 21 when the switch is rocked to cause the mercury to make contact with either of the electrodes 22 or 23.

The floor 25 of the envelope 20 on which the mercury 24 rests is convex upwards and the inner surface of the floor may be ground or etched in order to roughen it.

The switch 19 is so connected between the motor and a current source 26 that torque is applied to the outer gimbal 14 in one sense or the other according to whether the mercury makes contact with the electrode 22 or the electrode 23. Such applications of torque to the outer gimbal cause precession of the inner gimbal 12 in such a sense as to tend to move the mercury away from the electrode 22 or 23 with which it is in contact.

Thus the inner gimbal will tend to oscillate continually and regularly about the desired plane, and since the mercury will dwell at either extremity of the switch for substantially equal periods, the net torque about the inner gimbal axis due to the moving mass of mercury is substantially zero. Erratic drift of the gyro is thereby minimized. The precession of the outer gimbal due to the regular movement of the mercury mass is typically ±3′ of arc. The small oscillatory movements of the inner and outer gimbal bearings are beneficial in maintaining the freedom of the bearings.

The contact means may be connected to a circuit which operates some indicating mechanism such as a neon light or a pen recorder each time the mercury connects one of the contact means. As shown in Figure 1 two neon lamps 27 and 28 are shown so connected that they are energised alternately as the switch oscillates. When the gyroscope is working properly the mercury will connect each contact means 22, 23 alternately at approximately equal intervals of time. Thus the regular operation of the indicating means will indicate that the gyroscope is working properly.

The life of the switch is enhanced in that a good electrical contact is made rapidly at each changeover rather than the great number of makes and breaks of the dithering contact of switches heretofore used in similar applications.

I claim:

1. A gyroscope comprising a flywheel, an inner gimbal rotatably supporting said flywheel for rotation about a spin axis, an outer gimbal, a frame, said inner gimbal being mounted in said outer gimbal for rotary movement about a second axis, said outer gimbal being mounted in said frame for rotary movement about a third axis, said axes being mutually perpendicular, and a mercury switch mounted upon said inner gimbal, said switch comprising an envelope having a floor, a quantity of mercury in said envelope and movable over said floor, said floor being convex upwards to provide a short abrupt movement of said quantity of mercury between two contact making positions to minimize any precession caused by any shift in the center of gravity of said inner gimbal. at least three contact members positioned in said envelope to be engaged selectively in pairs by said mercury in extreme positions of said mercury within said envelope upon movement of said inner gimbal about said second axis, a means controlled by said mercury switch in respectively different directions according to whether said quantity of mercury is in one or the other of its extreme positions respectively to thereby cause said outer gimbal to oscillate.

2. A gyroscope according to claim 1, wherein said contact members comprise a common electrode and two mutuually insulated electrodes.

3. A gyroscope according to claim 1, wherein said contact members comprise a common electrode in continuous contact with said mercury and two mutually insulated electrodes.

4. A gyroscope according to claim 3, wherein said common electrode is convex upwards.

5. A gyroscope according to claim 1, wherein said envelope is of glass and the inner surface of said floor is roughened.

6. A gyroscope according to claim 1, comprising indicating means responsive to the engagement of said pairs of contact members by said mercury.

7. A gyroscope according to claim 1, comprising a reversible electric motor, coupled to said outer gimbal to cause rotary movements thereof about said third axis and a source of current, said contact member being coupled between said source and said motor to control the direction of rotation of said motor in dependence upon the one of said pairs of contact means that is engaged by said mercury and to produce cyclical reversal of the direction of torque exerted by said motor about said inner gimbal and thereby a cyclical reversal of the direction of the precession of said outer gimbal whereby the resultant precession in either direction is negligible.

8. In a gyroscope having an inner gimbal, means to rock said inner gimbal, bearing means for said inner gimbal, a mercury switch mounted upon said inner gimbal and comprising an envelope having a floor, a quantity of mercury in said envelope and movable over said floor, said floor being convex upwards to provide a short abrupt movement of said quantity of mercury between two contact making positions to minimize any precession caused by any shift in the center of gravity of said inner gimbal, and at least three contact members positioned in said envelope to be engaged selectively in pairs by said mercury upon rocking movement of said inner gimbal and connected to said means to rock to produce reversal of the direction of torque exerted by said means about said inner gimbal whereby to maintain freedom of said bearing means.

References Cited in the file of this patent

UNITED STATES PATENTS

| | | |
|---|---|---|
| 2,806,965 | Soper | Sept. 17, 1957 |
| 2,830,160 | Engel et al. | Apr. 8, 1958 |

FOREIGN PATENTS

| | | |
|---|---|---|
| 661,816 | Great Britain | Nov. 28, 1951 |
| 161,190 | Australia | Feb. 26, 1953 |
| 718,124 | Great Britain | Nov. 28, 1951 |
| 720,220 | Great Britain | Dec. 15, 1954 |